(12) United States Patent
Kusunoki (10) Patent No.: US 9,252,406 B2
(45) Date of Patent: Feb. 2, 2016

(54) ELECTRIC STORAGE APPARATUS

(71) Applicant: Lithium Energy Japan, Kyoto-shi (JP)

(72) Inventor: Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 116 days.

(21) Appl. No.: 14/037,801

(22) Filed: Sep. 26, 2013

(65) Prior Publication Data

US 2014/0093765 A1 Apr. 3, 2014

(30) Foreign Application Priority Data

Sep. 28, 2012 (JP) .................................. 2012-218356

(51) Int. Cl.
*H01M 4/00* (2006.01)
*H01M 2/10* (2006.01)
*H01M 10/613* (2014.01)

(52) U.S. Cl.
CPC .......... *H01M 2/1072* (2013.01); *H01M 10/613* (2015.04); *H01M 2220/20* (2013.01)

(58) Field of Classification Search
CPC .................. H01M 2220/20; H01M 10/613
USPC .................................................. 429/120, 163
See application file for complete search history.

(56) References Cited

U.S. PATENT DOCUMENTS

2011/0151314 A1 6/2011 Ogawa

FOREIGN PATENT DOCUMENTS

| JP | H09-298053 A | 11/1997 |
|----|--------------|---------|
| JP | 10-162796 A | 6/1998 |
| JP | 2010-49808 A | 3/2010 |
| JP | 2010-250984 A | 11/2010 |
| JP | 2011-134544 A | 7/2011 |
| JP | 2012-101663 A | 5/2012 |
| JP | 2012-164463 A | 8/2012 |
| JP | 2012-174972 A | 9/2012 |
| JP | 2012-178370 A | 9/2012 |

*Primary Examiner* — Cynthia H Kelly
*Assistant Examiner* — Monique Wills
(74) *Attorney, Agent, or Firm* — McGinn IP Law Group, PLLC (57) ABSTRACT

Provided is an electric storage that includes at least one electric storage device, a first external housing for housing the at least one electric storage device, and a second external housing for housing the first external housing, wherein the first external housing and the second external housing respectively include engaging portions, which are engaged with each other.

15 Claims, 10 Drawing Sheets

ELECTRIC STORAGE APPARATUS

CROSS-REFERENCE TO RELATED APPLICATIONS

This application claims the benefit of Japanese Patent Application No. 2012-218356, which is incorporated herein by reference.

FIELD

The present invention relates to an electric storage apparatus adopted for a power supply of machines and equipments. More specifically, the present invention relates to an electric storage apparatus including an electric storage device and an external housing for housing the electric storage device.

BACKGROUND

Electric drive machines and equipments such as hybrid electric vehicles (HEVs), electric vehicles (EVs), electric motorcycles, aircraft, and marine vessels include various output apparatuses such as motors, electric lights and indicators. Accordingly, an electric storage apparatus for supplying electric power to the output apparatuses is mounted on each electric drive machine and equipment.

The electric storage apparatus includes at least one electric storage device and an external housing for housing the at least one electric storage device. As a result, the electric storage apparatus secures electrical insulating properties by means of the external housing, while supplying the electric power corresponding to the number of electric storage devices to the output apparatuses.

There is known an electric storage apparatus that includes a first external housing for housing an electric storage device and a second external housing for housing the first external housing. The first external housing may randomly move inside the second external housing (the first external housing and the second external housing may collide against each other) due to an influence of vibrations generated when the electric storage apparatus is mounted on each electric drive machine and equipment. In order to prevent such an event, the first external housing and the second external housing are coupled to each other at a plurality of portions by coupling members such as screws.

As a result, the first external housing and the second external housing are kept at a given positional relationship, and form a double partition wall around the electric storage device. Accordingly, the electric storage apparatus of this type is excellent in durability (resistance to vibration), and the electric storage device can be reliably protected under a vibrational environment.

Meanwhile, in the electric storage apparatus of this type, the first external housing and the second external housing are coupled to each other at the plurality of portions by the coupling members as described above. Accordingly, when the first external housing is incorporated into the second external housing (the positional relationship between the first external housing and the second external housing is kept in a constant state) in the case of manufacture or maintenance check that requires disassembling, complicated coupling work (attachment work of the coupling members) must be made for the plurality of portions between the first external housing and the second external housing.

CITATION LIST

Patent Literature 1

Patent Literature 1: Japanese Patent Application Laid-Open No.

SUMMARY

The following presents a simplified summary of the invention disclosed herein in order to provide a basic understanding of some aspects of the invention. The summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage apparatus that enables incorporation of a first external housing into a second external housing without complicated work and can keep the first external housing and the second external housing in a constant or substantially constant positional relationship even if vibrations and the like are applied thereto.

An electric storage apparatus according to an aspect of the present invention includes at least one electric storage device, a first external housing for housing the at least one electric storage device, and a second external housing for housing the first external housing, wherein the first external housing and the second external housing respectively include engaging portions, which are engaged with each other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An electric storage apparatus according to an aspect of the present invention includes at least one electric storage device, a first external housing for housing the at least one electric storage device, and a second external housing for housing the first external housing, wherein the first external housing and the second external housing respectively include engaging portions, which are engaged with each other.

According to the electric storage apparatus configured as described above, when the first external housing is housed in the second external housing, the engaging portion of the first external housing is engaged with the engaging portion of the second external housing. As a result, the first external housing and the second external housing are positioned with respect to each other. Hence, according to the electric storage apparatus configured as described above, the first external housing and the second external housing can be kept in a constant or substantially constant positional relationship even if vibrations and the like are applied thereto.

In this way, according to the electric storage apparatus configured as described above, with an essential work of simply housing the first external housing in the second external housing in the case of manufacture or maintenance check that requires incorporation of the first external housing into the second external housing, the first external housing and the second external housing can be kept in a constant or substantially constant positional relationship even if vibrations and the like are applied thereto.

According to an aspect of the present invention, the electric storage apparatus may have a configuration in which a projection that is the engaging portion is formed on any one of an outer surface of the first external housing and an inner surface of the second external housing, an opening portion defined by an end edge that is the engaging portion is formed on any other one of the outer surface of the first external housing and the inner surface of the second external housing, and the projection is placed in the opening portion.

According to such a configuration, when the projection that is the engaging portion is placed in the opening portion defined by the end edge that is the engaging portion, the projection (engaging portion) hangs on the end edge (engaging portion) that defines the opening portion. As a result, the projection (engaging portion) is engaged with the end edge (engaging portion). Accordingly, simply housing the first external housing in the second external housing such that the projection is placed in the opening portion allows the first external housing and the second external housing to be positioned with respect to each other.

In this case, it is preferable that the opening portion be formed so as to be larger in size than the projection.

When the opening portion is formed so as to be larger in size than the projection as described above, the entire periphery of the projection is less likely to interfere with the entire peripheral edge of the opening portion, in a normal state or a normal installation state. Accordingly, an unwanted stress does not act on the first external housing in the normal state, whereby damage and the like to the projection and an area therearound can be suppressed.

Further, the projection may include a groove portion into which the end edge that defines the opening portion is to be fitted.

With this configuration, the end edge that defines the opening portion is fitted into the groove portion of the projection, whereby the first external housing and the second external housing restrict each other from moving. Accordingly, the first external housing and the second external housing can be kept in a constant or substantially constant positional relationship.

According to another aspect of the present invention, the first external housing may comprise resin, and the second external housing may comprise metal.

With this configuration, the first external housing protects the electric storage device while securing electrical insulating properties for the electric storage device. Further, the second external housing protects the first external housing and the electric storage device housed therein while enhancing the overall strength (rigidity). Accordingly, the electric storage apparatus is excellent in not only rigidity but also safety.

According to still another aspect of the present invention, the second external housing may include a framework for surrounding the first external housing.

With this configuration, the first external housing and the framework of the second external housing that surrounds the first external housing form a double partition wall. As a result, the rigidity around the first external housing can be reliably enhanced.

In this case, the first external housing may include the projection, the framework of the second external housing may include the opening portion, and the opening portion may be formed as a cutout opened at one end of the framework.

With this configuration, at the same time as the first external housing is housed (inserted) into the framework of the second external housing, the projection of the first external housing enters the opening portion from an opened area of the opening portion. As a result, at the same time as the incorporation of the first external housing into the second external housing, the projection is placed in the opening portion. Accordingly, in the electric storage apparatus, the first external housing can be easily incorporated into the second external housing.

The second external housing may further include a cover for closing the opening at the one end of the framework, and the cover may close an opened area of the opening portion while closing the opening at the one end of the framework.

With this configuration, in the state where the projection is placed in the opening portion, the opening of the framework can be closed by the cover. Consequently, the opened area of the opening portion in which the projection is placed is closed by the cover. Accordingly, movement of the projection is restricted by the end edge that defines the opening portion and the cover, whereby the first external housing and the second external housing can be reliably kept in a constant or substantially constant positional relationship.

The electric storage apparatus may further include a heat sink that is placed so as to be opposed to the first external housing.

With this configuration, when the electric storage device housed in the first external housing generates heat due to its charge and discharge, the heat is absorbed or radiated by the heat sink. Accordingly, when the electric storage device is repetitively charged and discharged (when the electric storage device generates heat), damage to the electric storage device caused by an influence of the heat can be suppressed.

As described above, the present invention can produce such excellent effects that the first external housing can be incorporated into the second external housing without complicated work and that the first external housing and the second external housing can be kept in a constant or substantially constant positional relationship when vibrations and the like are applied thereto.

Hereinafter, an electric storage apparatus according to an embodiment of the present invention is described with reference to the attached drawings.

Figure 1:
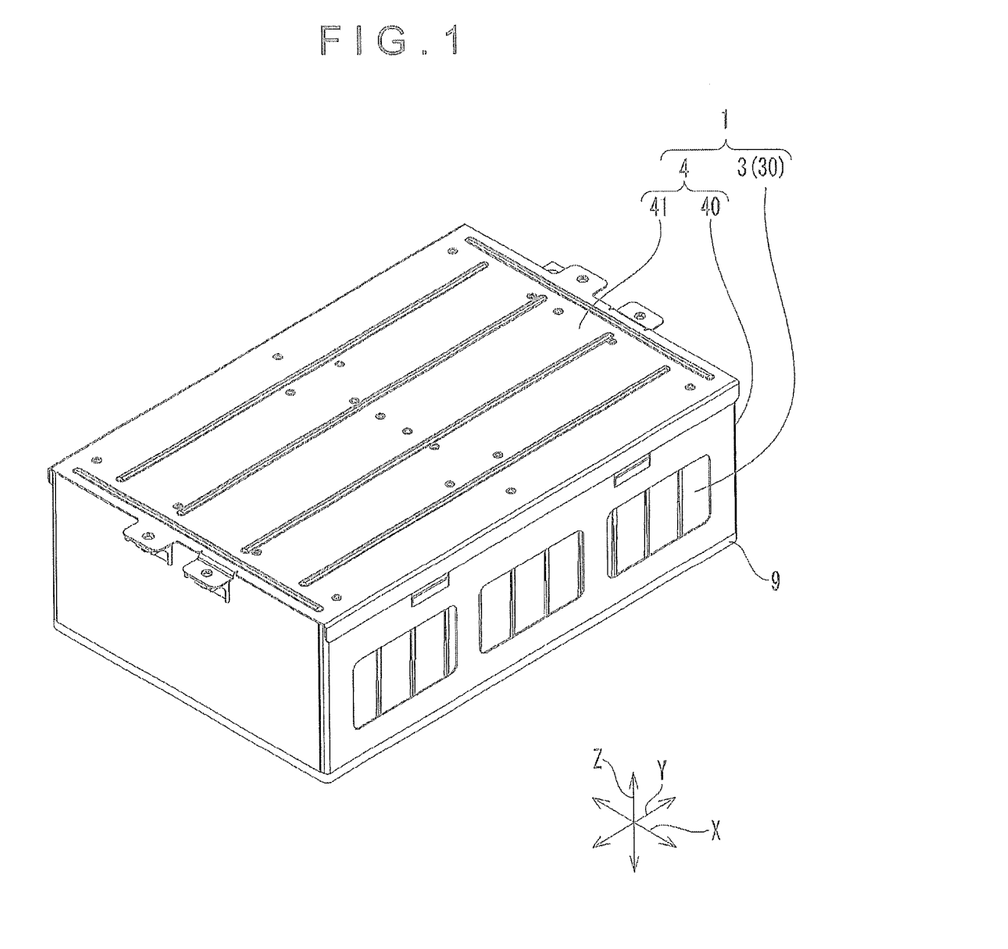
FIG. 1 is an overall perspective view of an electric storage apparatus (battery module) according to an embodiment of the present invention.
Figure 2:
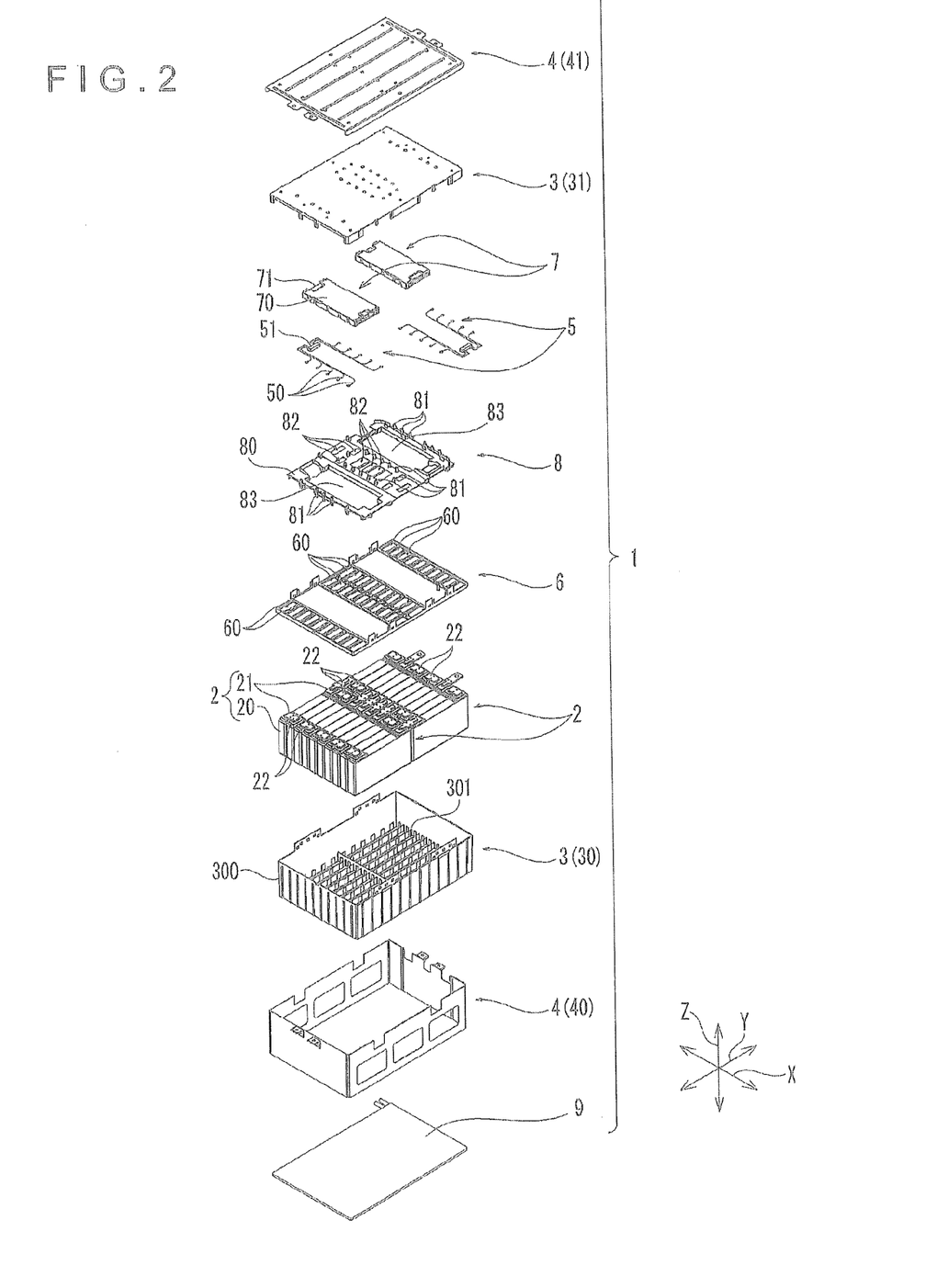
FIG. 2 is an exploded perspective view of the electric storage apparatus (battery module) according to the embodiment.

As illustrated in FIG. 1, the electric storage apparatus according to the present embodiment includes a first external housing 3 and a second external housing 4 for covering the first external housing 3. More specifically, as illustrated in FIG. 2, an electric storage apparatus 1 includes: at least one electric storage device 2; the first external housing 3 for housing the electric storage device 2; and the second external housing 4 for housing the first external housing 3.

In addition to the above-mentioned configuration, the electric storage apparatus 1 according to the present embodiment further includes: a signal line 5 connected to the electric storage device 2; a support member 6 placed on the electric storage device 2 housed in the first external housing 3; a monitoring apparatus 7 that is electrically connected to the electric storage device 2 through the signal line 5, the monitoring apparatus 7 being for electrically monitoring the electric storage device 2; and a frame member 8 for holding the signal line 5 placed between the monitoring apparatus 7 and the electric storage device 2. The electric storage apparatus 1 according to the present embodiment further includes a heat sink 9 for cooling the electric storage device 2.

A rechargeable secondary battery cell (in the present embodiment, a lithium-ion secondary battery cell) is adopted for the electric storage device 2. Note that, because the secondary battery cell is adopted for the electric storage device 2, the electric storage apparatus 1 is referred to as battery module, and the electric storage device 2 is referred to as battery cell, in the following description.

The battery cell 2 includes: a cell case 20 for housing an electrode assembly (not illustrated) including a positive electrode plate and a negative electrode plate; and a pair of external terminals 21, 21 placed outside of the cell case 20. In the present embodiment, the cell case 20 is formed in a hexahedral shape. That is, a prismatic cell is adopted for the battery cell 2. The battery cell 2 includes a positive electrode external terminal 21 and a negative electrode external terminal 21 as the pair of external terminals 21, 21. The positive electrode external terminal 21 and the negative electrode external terminal 21 are placed on one of the six surfaces forming the outer surface of the cell case 20.

The battery module 1 according to the present embodiment includes a plurality of battery cells 2. The plurality of battery cells 2 are arrayed longitudinally and laterally. That is, the plurality of battery cells 2 are placed in a plurality of rows and columns (in ten rows and two columns in the battery module 1 illustrated in the drawings). Accordingly, the battery module 1 includes bus bars 22 for electrically connecting the battery cells 2, 2. Each bus bar 22 connects the positive electrode external terminal 21 and the negative electrode external terminal 21 of the adjacent battery cells 2. The bus bar 22 may be screwed to the external terminals 21, or may be welded to the external terminals 21. In the present embodiment, the bus bar 22 is welded to the external terminal 21. As a result, the plurality of battery cells 2 are electrically connected in series, to thereby form a large-capacity battery.

The first external housing 3 includes a partition wall opposed to each battery cell 2. The first external housing 3 according to the present embodiment is a resin container for housing at least one battery cell 2. That is, the first external housing 3 is a resin molded article, and defines a space for housing the plurality of battery cells 2.

Figure 3:
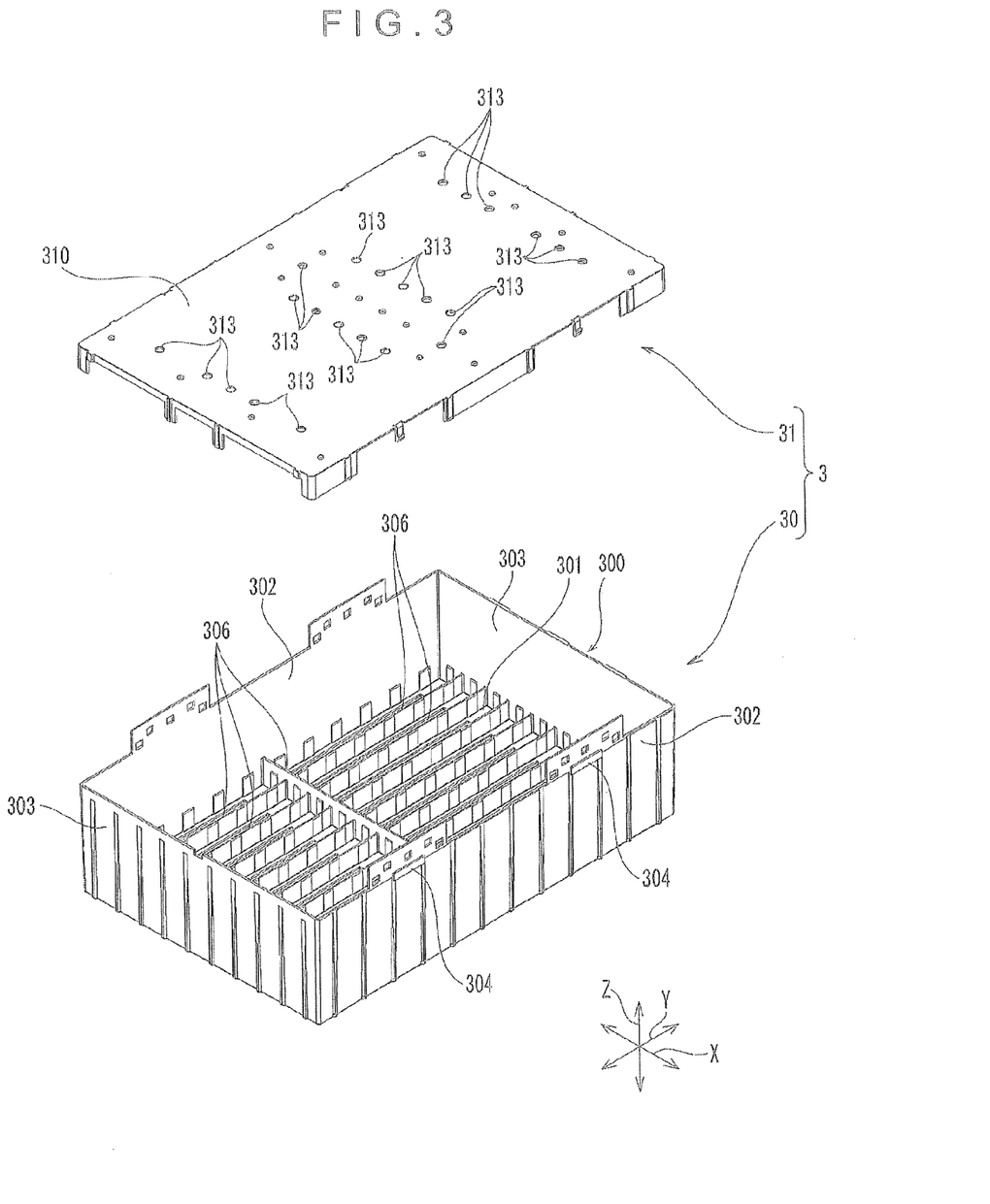
FIG. 3 is an exploded perspective view of a first external housing of the electric storage apparatus (battery module) according to the embodiment.

More specific description thereof is given. As illustrated in FIG. 3, the first external housing 3 includes a resin body 30 and a resin cover plate 31. The body 30 includes: the surrounding wall portion 300 having the first end and the second end in a first direction (a Z axis direction illustrated in the drawings), the surrounding wall portion 300 being opened at the first end and for collectively surrounding the plurality of battery cells 2; and the bottom portion 301 connected to the second end of the surrounding wall portion 300. The cover plate 31 includes a closing portion 310 for closing the opening of the surrounding wall portion 300.

A prismatic cell is adopted for each of the plurality of battery cells 2. The plurality of battery cells 2 are each placed in a matrix. Accordingly, the surrounding wall portion 300 of the body 30 is formed in a frame-like shape fitted to the matrix. That is, the surrounding wall portion 300 includes: a pair of first main wall portions 302, 302 that are opposed to each other with a space therebetween in a second direction (an X axis direction illustrated in the drawings) orthogonal to the first direction; and a pair of first side wall portions 303, 303 that are opposed to each other with a space therebetween in a third direction (a Y axis direction illustrated in the drawings) orthogonal to the first direction and the second direction. The respective first main wall portions 302, 302 and the respective first side wall portions 303, 303 are continuous with each other. As a result, the surrounding wall portion 300 is formed in a continuous rectangular shape.

Each of the first main wall portions 302, 302 and the first side wall portions 303, 303 is formed in a rectangular shape. In the present embodiment, the sizes of the respective first main wall portions 302, 302 and the respective first side wall portions 303, 303 in the first direction are set to be the same. In contrast, the size of each of the first main wall portions 302, 302 in the third direction is set to be longer than the size of each of the first side wall portions 303, 303 in the second direction. As a result, the surrounding wall portion 300 has a rectangular opening whose long sides are formed from the respective first main wall portions 302, 302 and short sides are formed from the respective first side wall portions 303, 303.

Moreover, the size of the first main wall portions 302, 302 in the first direction and the size of the first side wall portions 303, 303 in the first direction are set to be larger than the size of the electric storage devices 2 in the first direction. That is, the size of the surrounding wall portion 300 in the first direction is set to be larger than the size of the electric storage devices 2 in the first direction.

The first external housing 3 according to the present embodiment includes engaging portions (hereinafter, referred to as first engaging portions) 304 to be engaged with the second external housing 4 (second engaging portions 403 to be described later). The first engaging portions 304 are each formed of a projection. The first engaging portions (projections) 304 are formed integrally with the surrounding wall portion 300. That is, the first engaging portions 304 comprise resin similarly to the surrounding wall portion 300. In the present embodiment, a plurality of the first engaging portions 304 are provided with a space therebetween in the circumferential direction of the surrounding wall portion 300. More specifically, the first engaging portions 304 are provided to each of the pair of first main wall portions 302, 302. In the present embodiment, at least two first engaging portions 304 are provided to each of the pair of first main wall portions 302, 302. That is, at least two first engaging portions 304 are provided to each of the pair of first main wall portions 302, 302, with a space therebetween in the third direction. The first engaging portions 304 are formed so as to extend in the third direction at the same height in the first direction.

The inner surface of the bottom portion 301 is provided with positioning ribs 306 for such positioning that the plurality of battery cells 2 are placed in the matrix. As a result, the plurality of battery cells 2 are placed in the matrix in plan view, in the state where each one of a pair of the external terminals 21, 21 of each battery cell 2 faces the cover plate 31.

As described above, the cover plate 31 includes the closing portion 310, and can be coupled to the body 30 in the state where the opening of the body 30 is closed thereby. The planar shape of the closing portion 310 is set so as to conform to the shape of the opening of the surrounding wall portion 300. In the present embodiment, the surrounding wall portion 300 is formed in a frame-like shape (has the rectangular opening), and hence the closing portion 310 is formed in a rectangular shape in plan view.

The closing portion 310 includes through-holes 313. The through-holes 313 are respectively placed at positions corresponding to supporting posts 81 (to be described later; see FIG. 2) of the frame member 8. In the present embodiment, the frame member 8 is provided with a plurality of the supporting posts 81. Accordingly, the closing portion 310 includes a plurality of the through-holes 313. The diameter of each of the plurality of through-holes 313 is set to be larger than the outer diameter of the corresponding supporting post 81. That is, the through-hole 313 is formed so as to be insertable (pass completely through) the supporting post 81.

Figure 4:
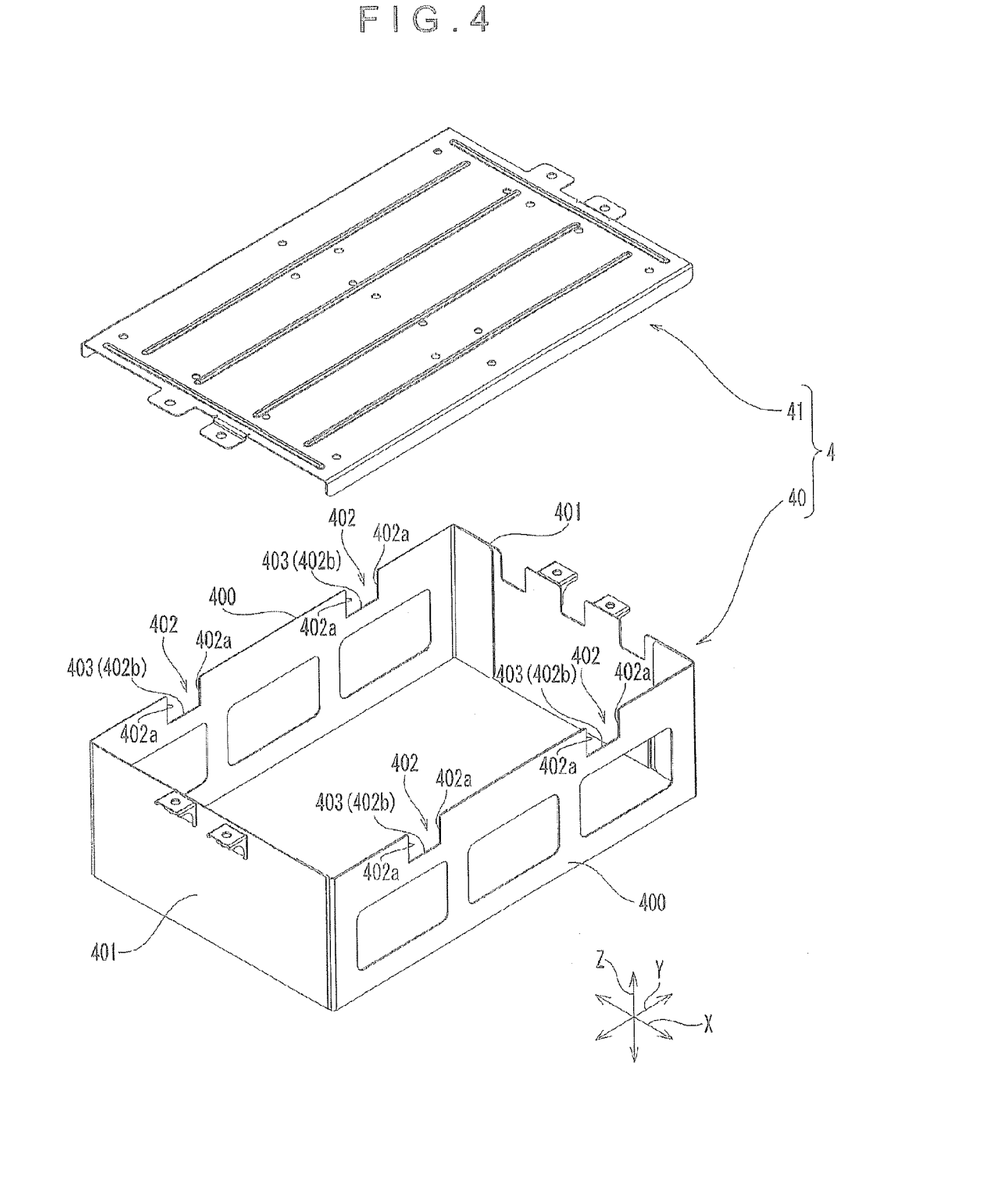
FIG. 4 is an exploded perspective view of a second external housing of the electric storage apparatus (battery module) according to the embodiment.

The second external housing 4 according to the present embodiment is a metal container for housing the first external housing 3. That is, the second external housing 4 defines a space for housing the first external housing 3. Then, as illustrated in FIG. 4, the second external housing 4 includes the engaging portions (hereinafter, referred to as second engaging portions) 403 to be respectively engaged with the first engaging portions 304 of the first external housing 3. The second external housing 4 according to the present embodiment includes opening portions 402 in which the first engaging portions 304 are to be respectively placed. Accordingly, the second engaging portions 403 are each formed of an end edge that defines the opening portion 402 of the second external housing 4.

More specific description thereof is given. The second external housing 4 includes a metal framework 40 and a metal cover 41. The framework 40 forms the first opening and a second opening at both ends in the first direction (the Z axis direction illustrated in the drawings), and surrounds the first external housing 3. The cover 41 closes the first opening of the framework 40.

The framework 40 has a first end (upper end) that defines the first opening in the first direction and a second end (lower end) that defines the second opening in the first direction. The framework 40 is obtained by processing a metal plate, and is formed so as to conform to the outer peripheral shape of the surrounding wall portion 300 of the first external housing 3. In the present embodiment, the surrounding wall portion 300 is formed in the continuous rectangular shape, and the framework 40 is also formed in a continuous rectangular shape accordingly. That is, the framework 40 includes: a pair of the second main wall portions 400, 400 that are opposed to each other with a space therebetween in the second direction (the X axis direction illustrated in the drawings); and a pair of the second side wall portions 401, 401 that are opposed to each other with a space therebetween in the third direction (the Y axis direction illustrated in the drawings).

The pair of second main wall portions 400, 400 and the pair of second side wall portions 401, 401 are each formed in a plate-like shape. The inner surfaces of the pair of second main wall portions 400, 400 and the inner surfaces of the pair of second side wall portions 401, 401 are parallel or substantially parallel to a central line (not illustrated; a central line that extends in the first direction) of the first opening and the second opening. That is, the inner surface of one of the second main wall portions 400 is parallel or substantially parallel to the inner surface of the other of the second main wall portions 400, and the inner surface of one of the second side wall portions 401 is parallel or substantially parallel to the inner surface of the other of the second side wall portions 401.

Each of the second main wall portions 400, 400 and the second side wall portions 401, 401 is formed in a rectangular shape. In the present embodiment, the sizes (maximum sizes) of the respective second main wall portions 400, 400 and the respective second side wall portions 401, 401 in the first direction are set to be the same. In contrast, the size of each of the second main wall portions 400, 400 in the third direction is set to be longer than the size of each of the second side wall portions 401, 401 in the second direction. As a result, the framework 40 has rectangular openings (the first opening and the second opening) whose long sides are formed from the respective second main wall portions 400, 400 and short sides are formed from the respective second side wall portions 401, 401.

Moreover, the size of the second main wall portions 400, 400 in the first direction and the size of the second side wall portions 401, 401 in the first direction are set to be larger than the size of the electric storage devices 2 in the first direction. That is, the size of the framework 40 in the first direction is set to be larger than the size of the electric storage devices 2 in the first direction.

In the present embodiment, the size of the framework 40 is set such that the framework 40 abuts against the outer periphery of the surrounding wall portion 300 of the first external housing 3. That is, the size of the framework 40 is determined such that the pair of first main wall portions 302, 302 respectively abut against the pair of second main wall portions 400, 400, while the pair of first side wall portions 303, 303 respectively abut against the pair of second side wall portions 401, 401.

The framework 40 includes the opening portions 402 in which the first engaging portions (projections) 304 are to be respectively placed. As described above, the plurality of first engaging portions 304 are provided to the first external housing 3 with a space therebetween in the circumferential direction of the surrounding wall portion 300. Accordingly, a plurality of the opening portions 402 are provided to the framework 40 with a space therebetween in the circumferential direction.

More specifically, the first engaging portions 304 are provided to each of the pair of first main wall portions 302, 302. Accordingly, the opening portions 402 are provided to each of the pair of second main wall portions 400, 400 that are respectively opposed to the pair of first main wall portions 302, 302. In the present embodiment, because at least two first engaging portions 304 are provided to each of the pair of first main wall portions 302, 302, at least two opening portions 402 are provided to each of the second main wall portions 400, 400 with a space therebetween in the third direction.

The opening portion 402 is set to be larger in size than the first engaging portion 304. In the present embodiment, because the first engaging portion 304 is formed so as to extend in the third direction, the opening portion 402 is formed in a rectangular shape wider in the third direction than the first engaging portion 304. The end edge that defines the opening portion 402 includes first end edges 402a that extend in the first direction and a second end edge 402b that extends in the third direction, and defines a region of the rectangular shape.

In the present embodiment, the opening portion 402 is formed as a cutout opened at the first end of the framework 40 (each of the second main wall portions 400, 400). Accordingly, the end edge that defines the opening portion 402 includes: a pair of the first end edges 402a, 402a that extend in the first direction and are placed with a space therebetween in the third direction; and the second end edge 402b that extends in the third direction and connects one ends of the pair of first end edges 402a, 402a to each other. Accordingly, the second end edge (lower end edge) 402b that defines the opening portion 402 forms the second engaging portion 403 to be engaged with the first engaging portion 304. That is, the second engaging portion 403 is formed so as to extend straight in the third direction. Accordingly, the second engaging portions 403 (the second end edges 402b that each define the opening portion 402) are provided at a plurality of portions at the same or substantially the same height in the first direction.

The cover 41 is obtained by press-forming a metal plate, and can be coupled to the framework 40 in the state where the first opening of the framework 40 is closed thereby. Because the framework 40 is provided with the opening portions 402 as the cutouts opened at the first end thereof, the cover 41 closes opened areas of the opening portions 402 while closing the first opening of the framework 40.

Returning to FIG. 2, the support member 6 is formed so as to be placeable on the plurality of battery cells 2 inside the first external housing 3 (surrounding wall portion 300). More specifically, in order to place the support member 6 inside the opening of the surrounding wall portion 300, the support member 6 is formed so as to conform to the inner peripheral shape of the surrounding wall portion 300. In the present embodiment, the support member 6 is placed inside the opening of the surrounding wall portion 300 so as to be in contact with the first external housing 3. More specific description thereof is given. The support member 6 is placed inside of the opening of the surrounding wall portion 300 such that the outer periphery edge portion is in contact with the inner periphery of the surrounding wall portion 300. Further, the support member 6 is supported by (coupled to) the surrounding wall portion 300 so as to be located above the plurality of battery cells 2.

The support member 6 is provided with first exposure portions 60 for exposing the respective external terminals 21, 21 of the battery cells 2 and the bus bars 22. In the present embodiment, because the bus bars 22 are placed in a plurality of portions as described above, the support member 6 is provided with the first exposure portions 60 at positions corresponding to the plurality of bus bars 22, respectively. More specifically, in the battery module 1 according to the present embodiment, because the plurality of battery cells 2 are placed in ten rows and two columns, the plurality of bus bars 22 are placed in a plurality of columns (three columns) with a space therebetween in the third direction. Accordingly, the plurality of first exposure portions 60 arrayed in the second direction are provided in both end parts and a central part of the support member 6 in the third direction.

The monitoring apparatus 7 includes a control substrate for performing electronic control and a substrate case 70 for covering the control substrate. The control substrate includes, mounted thereon, a connector 71 for connecting a CPU, a memory, and the signal line 5 (harness). The substrate case 70 surrounds the entire control substrate with the connector 71 being exposed.

The frame member 8 defines a wiring route for the signal line 5. More specific description thereof is given. The frame member 8 includes: a base 80 for defining the wiring route for the signal line 5; and the supporting posts 81 that are provided so as to intersect with the base 80 in the first direction.

The base 80 is formed so as to be placeable on the support member 6 placed inside the first external housing 3. The base 80 is provided with second exposure portions 82 for exposing the respective external terminals 21, 21 of the battery cells 2 and the bus bars 22 through the first exposure portions 60 of the support member 6.

More specific description thereof is given. The base 80 is formed in a rectangular shape in plan view. The size of the base 80 according to the present embodiment in the second direction corresponds to the size of the support member 6 in the second direction. In the present embodiment, the frame member 8 is placed inside the opening of the surrounding wall portion 300 so as to be in contact with the first external housing 3. More specific description thereof is given. The frame member 8 is placed inside the opening of the surrounding wall portion 300 such that both end parts of the base 80 in the second direction are in contact with the inner periphery of the surrounding wall portion 300.

Further, the size of the base 80 in the third direction is set to be shorter than the size of the support member 6 in the third direction. That is, the base 80 is placeable on the support member 6 so as not to overlap with the plurality of first exposure portions 60 that are provided in both the end parts of the support member 6 in the third direction. Consequently, the base 80 according to the present embodiment is provided with the plurality of second exposure portions 82 at positions corresponding to the plurality of first exposure portions 60 arrayed in the central part of the support member 6 in the third direction, respectively.

The base 80 has a first surface and a second surface opposite to the first surface in the first direction. The wiring route for the signal line 5 is set on the base 80. Then, control apparatus placement regions 83 for placing the monitoring apparatus 7 are set on the second surface of the base 80. The start point of the wiring route is set on the basis of each control apparatus placement region 83 (the connector 71 of the monitoring apparatus 7 placed in each control apparatus placement region 83).

In the present embodiment, the signal line 5 (harness) is an aggregation of a plurality of lead wires 50, and includes a connector 51 to which the start ends of the plurality of lead wires 50 are connected, the connector 51 being connected to the connector 71 of the monitoring apparatus 7. Each of the plurality of lead wires 50 (signal line 5) runs out of the route in accordance with the placement of the corresponding bus bar 22 (the bus bar 22 that is exposed in the first exposure portion 60 or the bus bar 22 that is exposed in the second exposure portion 82 through the first exposure portion 60) to be connected to the corresponding bus bar 22. In the present embodiment, the control apparatus placement regions 83 are set in two portions with a space therebetween in the third direction. Accordingly, wiring routes respectively corresponding to the two control apparatus placement regions 83, 83 are set on the base 80.

The supporting posts 81 extend in the first direction so as to intersect with the base 80. In the present embodiment, the through-holes 313 are provided in a plurality of portions. Accordingly, the plurality of supporting posts 81 are provided so as to respectively correspond to the positions of the through-holes 313. Each supporting post 81 is formed so as to abut against the support member 6 on the first surface side of the base 80 and so as to be inserted through the corresponding through-hole 313 of the cover plate 31 to protrude outward on the second surface side of the base 80. As a result, in the state where the cover 41 closes the first opening of the framework 40, the supporting post 81 is sandwiched between the cover 41 and the support member 6.

The heat sink 9 is placed so as to be opposed to the first external housing 3. The heat sink 9 may be of air cooling type including a heat radiating fin for increase in surface area, and may be of water cooling type in which cooling water is circulated inside. In the present embodiment, the water cooling type is adopted for the heat sink 9.

In the present embodiment, the framework 40 has the second opening, and the heat sink 9 is placed so as to close the second opening of the framework 40. That is, the heat sink 9 is formed in a plate-like shape that enables the second opening of the framework 40 to be closed. As a result, in the state where the heat sink 9 closes the second opening of the framework 40, the heat sink 9 is opposed to the first external housing 3 (bottom portion 301), and absorbs heat from the battery cell 2 housed in the first external housing 3. Note that the heat sink 9 is in contact with the first external housing 3 (the bottom portion 301 of the body 30), in order to enhance the heat radiation properties (cooling properties) for the battery cell 2.

Figure 5:
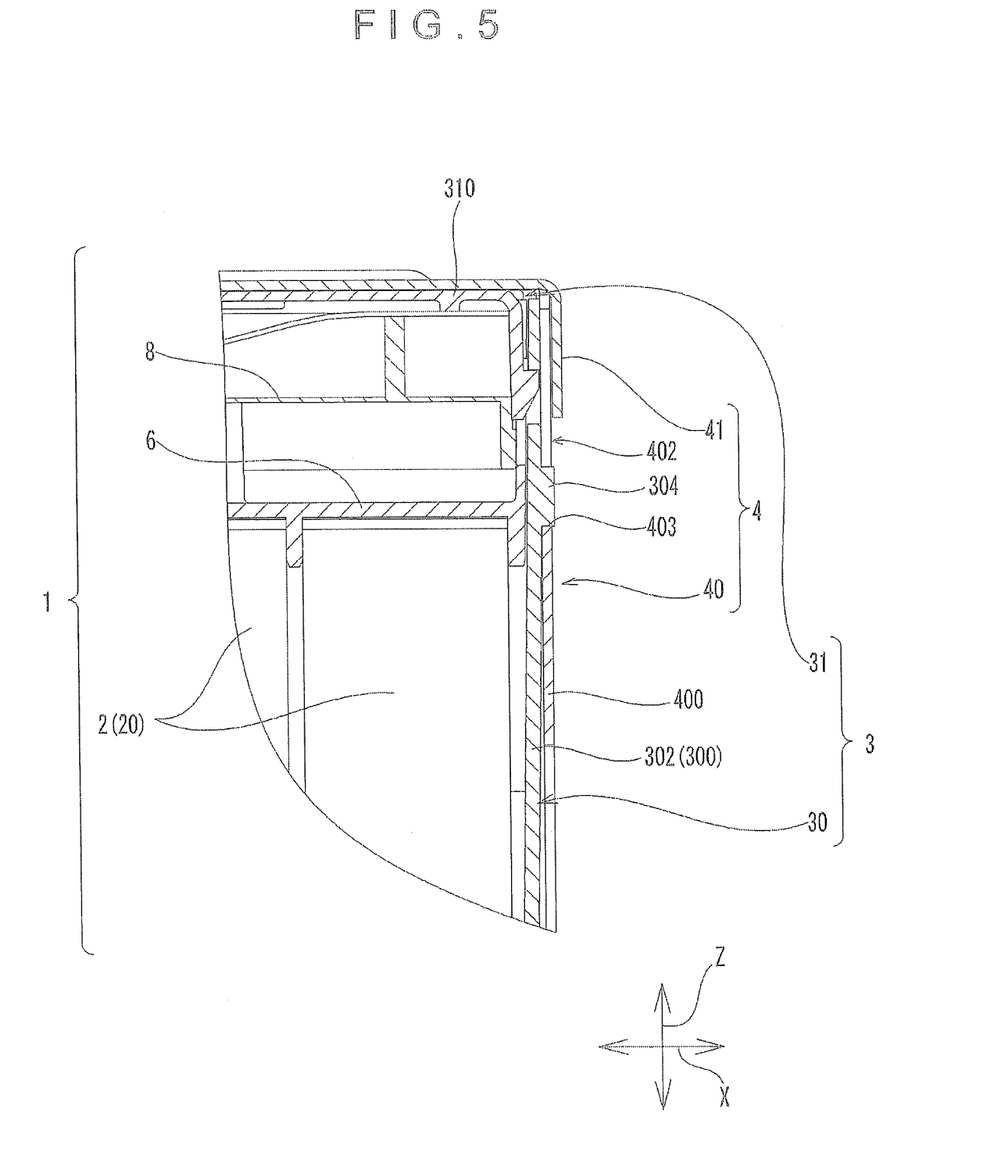
FIG. 5 is a partial enlarged sectional view of the electric storage apparatus (battery module) according to the embodiment.

The battery module 1 according to the present embodiment is configured as described above. According to the battery module 1 thus configured, as illustrated in FIG. 5, when the first external housing 3 is housed in the second external housing 4, the first engaging portion 304 of the first external housing 3 is engaged with the second engaging portion 403 of the second external housing 4. As a result, the first external housing 3 and the second external housing 4 are positioned with respect to each other, and are kept in a constant positional relationship even if vibrations and the like are applied thereto.

In this way, according to the battery module 1 configured as described above, with an essential work of simply housing the first external housing 3 in the second external housing 4 in the case of manufacture or maintenance check that requires incorporation of the first external housing 3 into the second external housing 4, the first external housing 3 and the second external housing 4 can be kept in a constant or substantially constant positional relationship even if vibrations and the like are applied thereto.

In the present embodiment, the projection that is the first engaging portion 304 is formed on the outer surface of the first external housing 3, and the opening portion 402 defined by the end edge that is the second engaging portion 403, in which the first engaging portion 304 (projection) is to be placed, is formed in the second external housing 4. Hence, when the projection that is the first engaging portion 304 is placed in the opening portion 402 defined by the end edge that is the second engaging portion 403, the projection (first engaging portion 304) is engaged in a hanging state with the end edge (second engaging portion 403) that defines the opening portion 402. Accordingly, simply housing the first external housing 3 in the second external housing 4 such that the projection 304 is placed in the opening portion 402 allows the first external housing 3 and the second external housing 4 to be positioned with respect to each other.

Then, in the present embodiment, because the opening portion 402 is formed so as to be larger in size than the projection that is the first engaging portion 304, the entire periphery of the first engaging portion (projection) 304 is less likely to interfere with the entire peripheral edge of the opening portion 402, in a normal state. Accordingly, an unwanted stress does not act on the first external housing 3 in the normal state (installation state), whereby damage and the like to the first engaging portion (projection) 304 and an area therearound can be suppressed.

Moreover, in the present embodiment, the first external housing 3 includes the surrounding wall portion 300 and the bottom portion 301. Hence, after the first external housing 3 is housed in the second external housing 4, the electric storage device 2, the support member 6, and the frame member 8 can be housed in the stated order in the first external housing 3. That is, the first engaging portion 304 is engaged with the second engaging portion 403, whereby the first external housing 3 and the second external housing 4 are positioned with respect to each other. In this state, the electric storage device 2, the support member 6, and the frame member 8 can be housed in the first external housing 3. Accordingly, the electric storage apparatus can be easily assembled.

Further, in the present embodiment, the first external housing 3 comprises resin, and the second external housing 4 comprises metal. Hence, the first external housing 3 protects the battery cell 2 while securing electrical insulating properties for the battery cell 2. On the other hand, the second external housing 4 protects the first external housing 3 and the battery cell 2 housed therein while enhancing the overall strength (rigidity). Accordingly, the battery module 1 according to the present embodiment is excellent in safety aspect and strength aspect.

In particular, in the case where the electric storage apparatus 1 is mounted on an electric machine or equipment (for example, a hybrid electric vehicle (HEV), an electric vehicle (EV), an electric motorcycle, an aircraft, or a marine vessel), vibrations from the electric machine are transmitted to the electric storage device 2. Fortunately, as in the electric storage apparatus 1 according to the present embodiment, with the external housing for housing the electric storage device formed of a resin member (in the present embodiment, the first external housing 3) and a metal member (in the present embodiment, the second external housing 4), the strength of the external housing can be secured, and the electric storage device 2 can be protected.

In particular, in the present embodiment, the second external housing 4 includes the framework 40 for surrounding the first external housing 3, and hence the first external housing 3 and the framework 40 of the second external housing 4 that surrounds the first external housing 3 together form a double partition wall. As a result, the rigidity around the first external housing 3 can be reliably enhanced.

Further, the first external housing 3 includes the projection that is the first engaging portion 304, the framework 40 of the second external housing 4 includes the opening portion 402 defined by the end edge that is the second engaging portion 403, and the opening portion 402 is formed as the cutout opened at the first end of the framework 40. Hence, at the same time as the first external housing 3 is housed (inserted) into the framework 40 of the second external housing 4, the projection that is the first engaging portion 304 enters the opening portion 402 from the opened area of the opening portion 402. As a result, at the same time as the incorporation of the first external housing 3 into the second external housing 4, the first engaging portion (projection) 304 is placed in the opening portion 402. Accordingly, the incorporation of the first external housing 3 into the second external housing 4 is easily made.

Further, the second external housing 4 also includes the cover 41 for closing the first opening of the framework 40, and the cover 41 closes the opened area of the opening portion 402 while closing the first opening of the framework 40. Hence, when the first opening of the framework 40 is closed by the cover 41 in the state where the projection 304 is placed in the opening portion 402, the opened area of the opening portion 402 in which the projection 304 is placed is closed by the cover 41. Accordingly, movement of the projection 304 is restricted by: the end edge (the first end edges 402a, 402a and the second end edge 402b (second engaging portion 403)) that defines the opening portion 402; and the cover 41, whereby the first external housing 3 and the second external housing 4 are reliably kept in a constant or substantially constant positional relationship.

Further, in the present embodiment, the heat sink 9 is placed so as to be opposed to the first external housing 3. Hence, even if the battery cell 2 housed in the first external housing 3 generates heat due to its charge and discharge, the heat is absorbed or radiated by the heat sink 9. Accordingly, even if the battery cell 2 is repetitively charged and discharged (even if the battery cell 2 generates heat), an influence of the heat can be suppressed.

Note that the present invention is not limited to the above-mentioned embodiment, and may be modified as appropriate within a range not departing from the spirit and scope of the present invention, as a matter of course.

In the above-mentioned embodiment, the first external housing 3 (the body 30 and the cover plate 31) comprises resin, and the second external housing 4 (the framework 40 and the cover 41) comprises metal, but the present invention is not limited thereto. For example, the entirety or a part of the first external housing 3 (the body 30 and the cover plate 31) may comprise metal. In this case, it is a matter of course that, in order to secure electrical insulating properties for the battery cell 2 housed in the first external housing 3, a sheet having electrical insulating properties may be attached to the inner surface of the first external housing 3, or an electrical insulating layer (for example, coating) having electrical insulating properties may be provided on the inner surface of the first external housing 3. Alternatively, the second external housing 4 (the framework 40 and the cover 41) may comprise resin instead.

In the above-mentioned embodiment, the heat sink 9 is provided, but the heat sink 9 may be provided as needed. Further, in the case where the heat sink 9 is provided, the heat sink 9 is not limited to one for closing the second opening of the framework 40. For example, the heat sink 9 may be placed between the first external housing 3 and the second external housing 4, and may be placed outside of the second external housing 4. That is, the heat sink 9 may be placed so as to be opposed directly or indirectly to the first external housing 3 in which the battery cell 2 is housed. Similarly with this configuration, even if the battery cell 2 generates heat due to its charge and discharge, the heat from the battery cell 2 is absorbed by the heat sink 9 through the first external housing 3 or the first external housing 3 and the second external housing 4.

Figure 6:
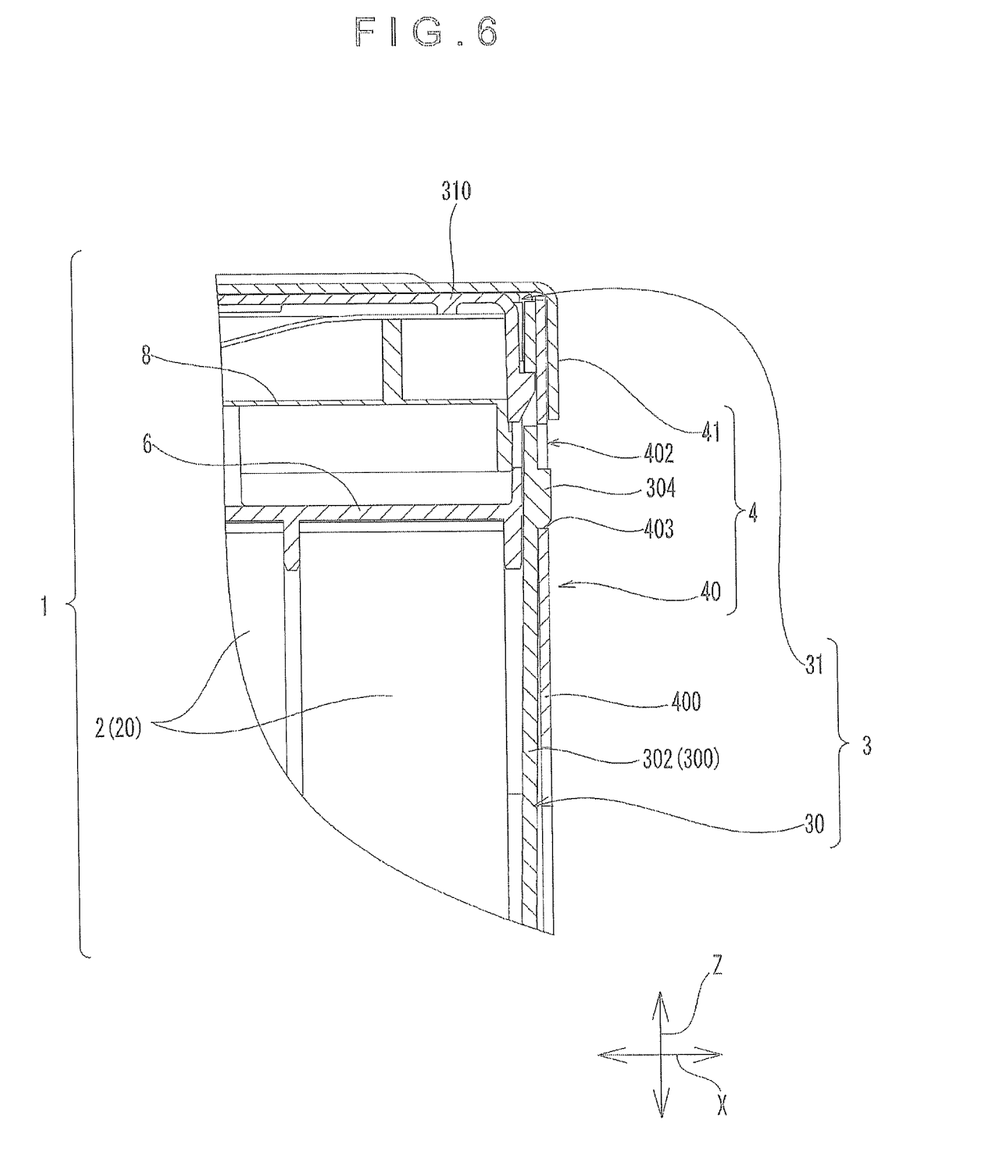
FIG. 6 is a partial enlarged sectional view of the electric storage apparatus (battery module) according to another embodiment of the present invention.

In the above-mentioned embodiment, the opening portion 402 of the second external housing 4 is formed as the cutout in the framework 40 forming the second external housing 4, but the present invention is not limited thereto. For example, as illustrated in FIG. 6, the opening portion 402 may be formed as a hole surrounded by an unopened surface, in the second external housing 4 (framework 40).

In the above-mentioned embodiment, the projection that is the first engaging portion 304 is provided on the outer surface of the first external housing 3 (the surrounding wall portion 300 of the body 30), and the opening portion 402 in which the first engaging portion (projection) 304 is to be placed is provided to the second external housing 4, but the present invention is not limited thereto. For example, the upper end edge of the framework 40 of the second external housing 4 may be configured as the second engaging portion 403, and the upper end edge thus configured may be engaged with the first engaging portion 304. Alternatively, a projection that is the second engaging portion 403 may be provided to the framework 40 of the second external housing 4, the upper end of the body 30 of the first external housing 3 may be configured as the first engaging portion 304, and the projection may be engaged with the upper end thus configured.

Figure 7:
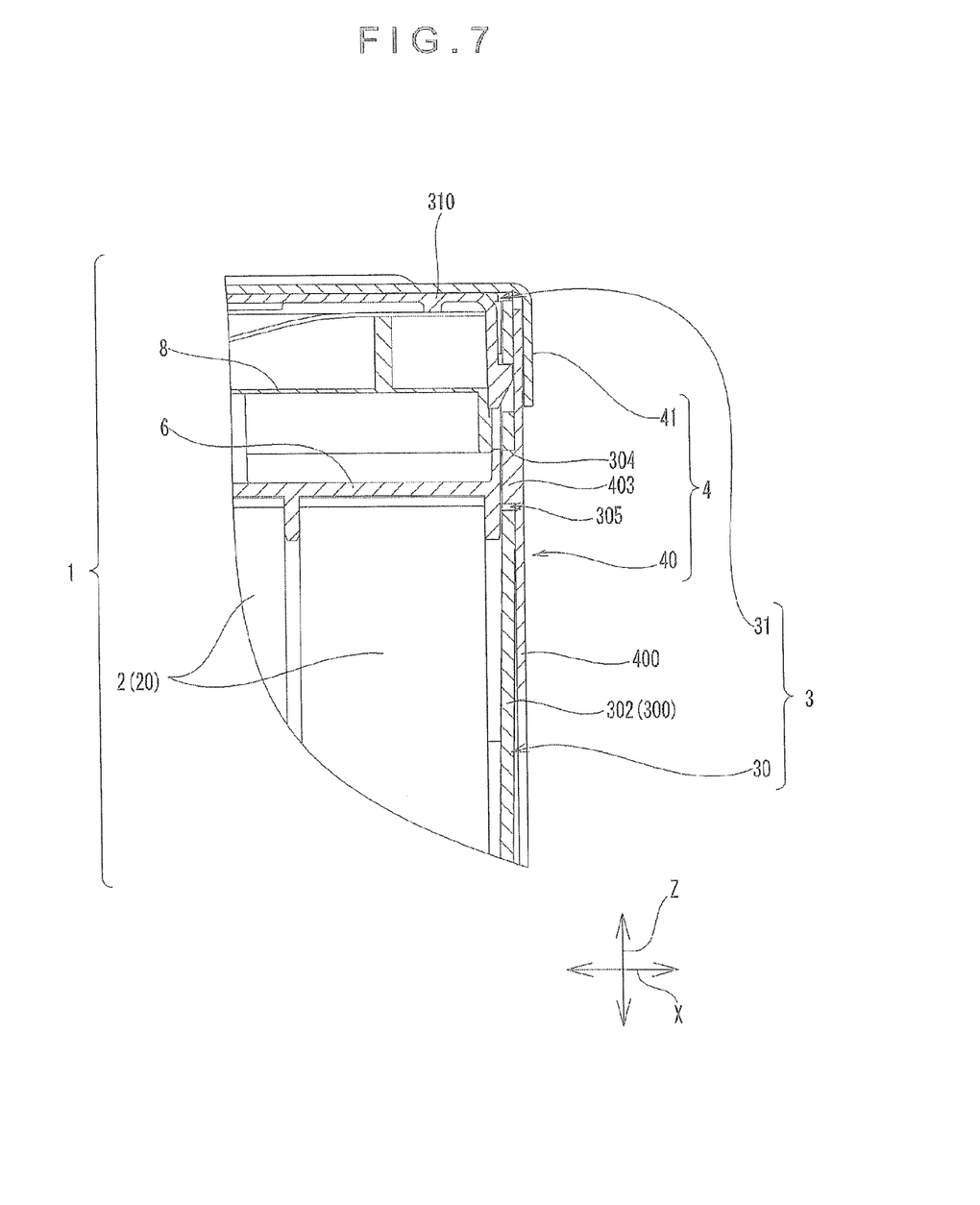
FIG. 7 is a partial enlarged sectional view of the electric storage apparatus (battery module) according to another embodiment of the present invention.

In the above-mentioned embodiment, the projection that is the first engaging portion 304 is provided on the outer surface of the first external housing 3 (the surrounding wall portion 300 of the body 30), and the opening portion 402 is provided to the second external housing 4 (framework 40), but the present invention is not limited thereto. For example, as illustrated in FIG. 7, the projection that is the second engaging portion 403 may be provided on the inner surface of the second external housing 4 (framework 40), and an opening portion 305 in which the second engaging portion (projection) 403 is to be placed may be provided on the outer surface of the first external housing 3.

Further, in the above-mentioned embodiment, the opening portion 402 that passes completely through the framework 40 in the thickness direction thereof (the entirety in the thickness direction including the inner surface of the framework 40) is provided to the second external housing 4 (framework 40), but the present invention is not limited thereto. For example, the opening portion 402 may not pass completely through the framework 40 (for example, may be formed as a recessed portion or a groove opened toward a portion to be engaged therewith). That is, in the case where an opening portion in which a projection is to be placed is provided, whether or not the opening portion passes completely through the wall, the opening portion 305, 402 may be provided so as to be opened on the outer surface of the first external housing 3 or the inner surface of the second external housing 4 that is opposed to the surface on which the projection 403, 304 is provided.

Figure 8:
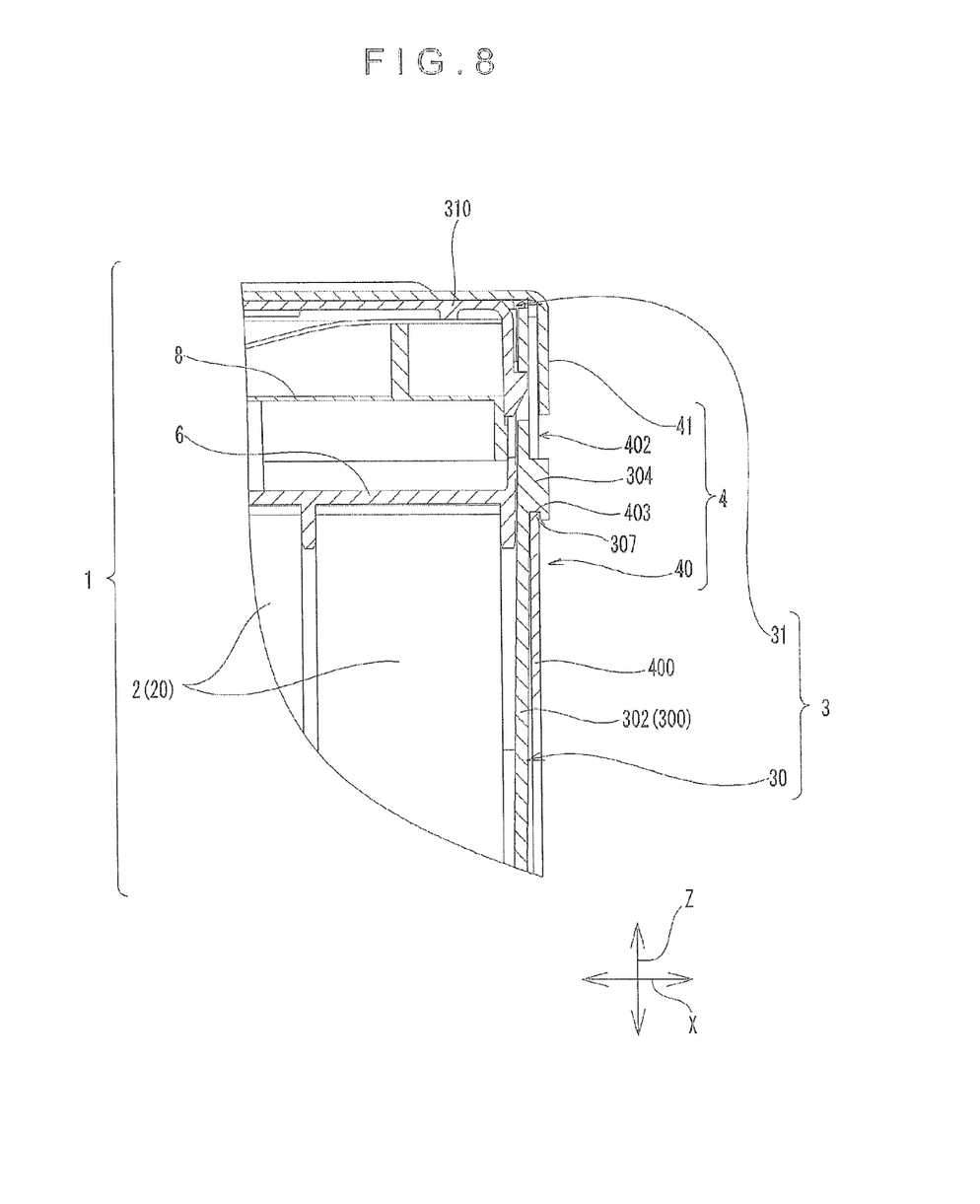
FIG. 8 is a partial enlarged sectional view of the electric storage apparatus (battery module) according to yet another embodiment of the present invention.

In the above-mentioned embodiment, the first engaging portion 304 is configured as the simple projection, but the present invention is not limited thereto. For example, as illustrated in FIG. 8, the projection that is the first engaging portion 304 may include a groove portion 307 into which the end edge (second end edge) that is the second engaging portion 403 that defines the opening portion 402 is to be fitted. With this configuration, the second engaging portion 403 is kept fitted in the groove portion 307, and the first external housing 3 and the second external housing 4 restrict each other from moving. Accordingly, the first external housing 3 and the second external housing 4 can be kept in a constant or substantially constant positional relationship.

Figure 9:
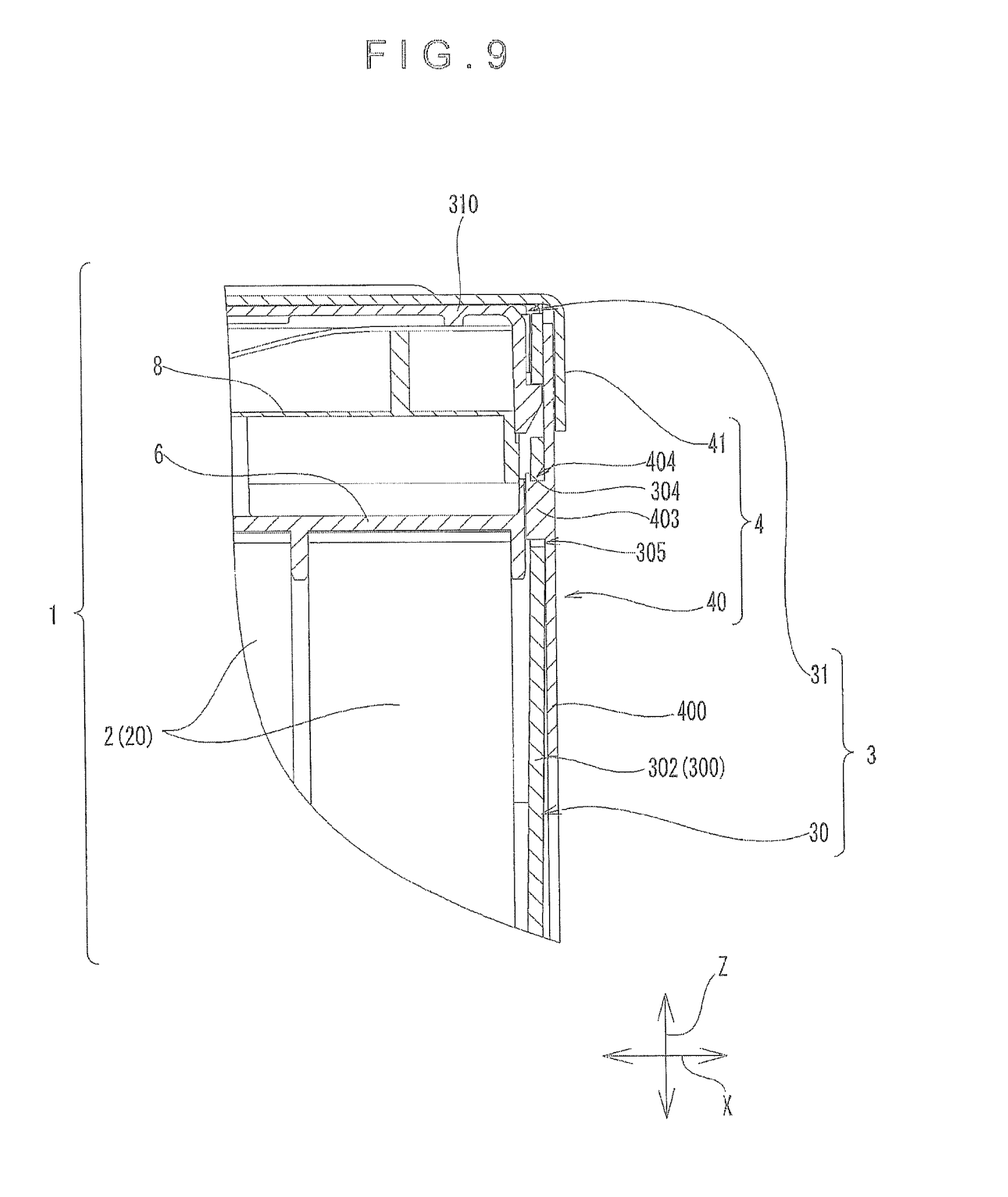
FIG. 9 is a partial enlarged sectional view of the electric storage apparatus (battery module) according to yet another embodiment of the present invention.

Then, as illustrated in FIG. 9, such a configuration as described above can be applied to the case where the opening portion 305 defined by the end edge that is the first engaging portion 304 is provided to the first external housing 3 and where the projection that is the second engaging portion 403 is provided to the second external housing 4. That is, a groove portion 404 into which the end edge (first engaging portion 304) that defines the opening portion 305 provided to the first external housing 3 is to be fitted may be provided to the second engaging portion 403 of the second external housing 4. In this case, the opening portion 402 is formed as the hole, and an upper part of the end edge that defines the opening portion 402 serves as the first engaging portion 304. Accordingly, the groove portion 404 opened upward is provided to the projection that is the second engaging portion 403.

Figure 10:
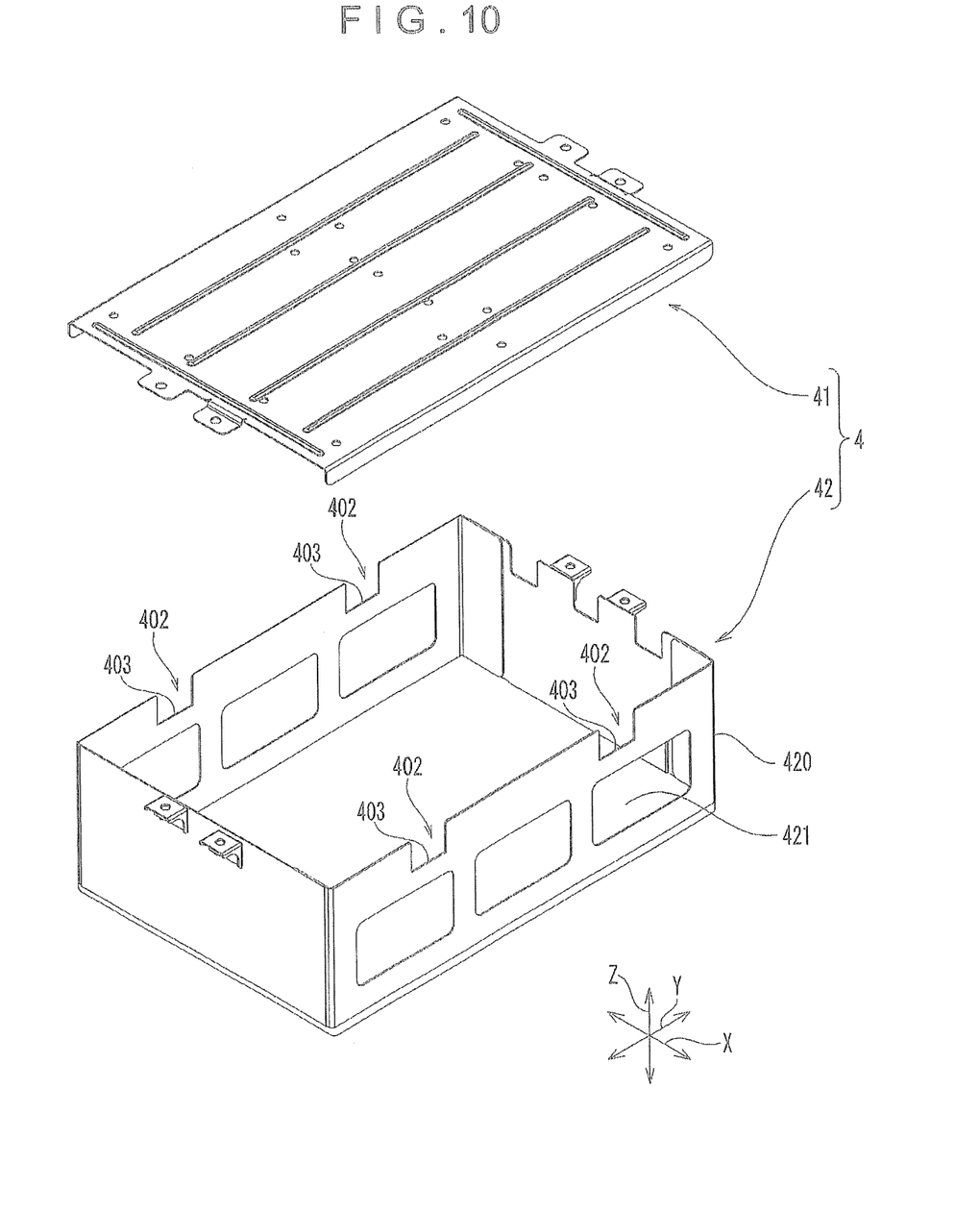
FIG. 10 is an exploded perspective view of the second external housing of the electric storage apparatus (battery module) according to yet another embodiment of the present invention.

In the above-mentioned embodiment, the second external housing 4 includes the framework 40 and the cover 41, but the present invention is not limited thereto. For example, the second external housing 4 may include only the framework 40. Further, the second external housing 4 is not limited to one including the framework 40 having the first opening and the second opening at both the ends thereof in the first direction. For example, as illustrated in FIG. 10, the second external housing 4 may include a case 42 including: a frame portion 420 having a first end and a second end in the first direction, the frame portion 420 being opened at the first end and surrounding the battery cell 2; and a bottom portion 421 connected to the second end of the frame portion 420, the bottom portion 421 being formed integrally with the frame portion 420. In this case, the frame portion 420 can be formed similarly to the framework 40 in the above-mentioned embodiment, the second external housing 4 may include the cover 41 for closing a first opening of the case 42, and the first opening of the case 42 may be kept opened.

In the above-mentioned embodiment, the plurality of battery cells 2 are provided, but the present invention is not limited thereto. For example, only a single battery cell may be provided instead of a plurality of the battery cells 2. That is, the number of the battery cells 2 may be set as appropriate such that required electric power can be supplied.

In the above-mentioned embodiment, the first engaging portion 304 is formed so as to extend in the third direction (circumferential direction), but the present invention is not limited thereto. For example, the first engaging portion 304 may be formed such that the length thereof in the third direction (circumferential direction) is smaller than the length thereof in the first direction or that the length thereof in the third direction (circumferential direction) is the same as the length thereof in the first direction. In this case, the opening portion 402 may be formed such that the first engaging portion 304 can be placed therein and that the end edge that defines the opening portion 402 can be engaged with the first engaging portion 304, as the second engaging portion 403.

In the above-mentioned embodiment, the opening portion 402 of the second external housing 4 is set to be larger in size than the first engaging portion 304, but the present invention is not limited thereto. For example, the opening portion 402 may be formed so as to conform to the form and size of the first engaging portion 304. That is, the opening portion 402 may be formed so as to allow the first engaging portion 304 to be inserted therein.

In the above-mentioned embodiment, the opening portion 402 is provided, and the end edge (second end edge 402b) that defines the opening portion 402 is configured as the engaging portion 403, but the present invention is not limited thereto. For example, the projection that is the engaging portion 304, 403 may be provided on the outer surface of the first external housing 3 or the inner surface of the second external housing 4, and the upper end of the first external housing 3 (body 30) or the first end (upper end) of the second external housing 4 (framework 40) may be configured as the engaging portion 403, 304 to be engaged with the projection 304, 403.

In the above-mentioned embodiment, at least two first engaging portions 304 and at least two second engaging portions 403 are provided, but the present invention is not limited thereto. At least one first engaging portion 304 and at least one second engaging portion 403 may be provided. It goes without saying that the numbers, sizes, and placements of the engaging portions 304, 403 are set such that the posture of the first external housing 3 in which the battery cell 2 is housed is proper inside the second external housing 4 in the state where the engaging portion (first engaging portion 304) of the first external housing 3 is engaged with the engaging portion (second engaging portion 403) of the second external housing 4.

In the above-mentioned embodiment, the rechargeable secondary battery cell (lithium-ion secondary battery cell) is adopted for the electric storage device 2, but the present invention is not limited thereto. For example, a primary battery cell may be adopted for the electric storage device 2. Further, the electric storage device 2 is not limited to a battery cell, but may be a capacitor.

In the above-mentioned embodiment, the device (prismatic cell) including the hexahedral (cuboid in appearance) cell case 20 is adopted for the electric storage device 2, but the present invention is not limited thereto. For example, a device including a cell case 20 having a columnar shape may be adopted for the electric storage device 2.

What is claimed is:

1. An electric storage apparatus, comprising:
a plurality of electric storage devices, each electric storage device including a cell case in which an electrode assembly is accommodated, the cell case having a substantially hexahedral shape;
a first external housing for housing the electric storage devices, the first external housing comprising a pair of first main wall portions that are opposed to each other and a pair of first side wall portions that are opposed to each other, the pair of first main wall portions and the pair of first side wall portions defining a first opening at at least one end in a first direction thereof; and
a second external housing for housing the first external housing, the second external housing comprising a pair of second main wall portions that are opposed to each other and a pair of second side wall portions that are opposed to each other, the pair of second main wall portions and the pair of second side wall portions defining a second opening at at least one end in the first direction thereof,
wherein the first external housing and the second external housing respectively include engaging portions, which are engaged with each other.

2. The electric storage apparatus according to claim 1, wherein a projection that includes one of the engaging portions is formed on one of an outer surface of the first external housing and an inner surface of the second external housing,
wherein an opening portion defined by an end edge that includes another one of the engaging portion is formed on an other one of the outer surface of the first external housing and the inner surface of the second external housing, and
wherein the projection is placed in the opening portion.

3. The electric storage apparatus according to claim 2, wherein the opening portion is formed so as to be larger in size than the projection.

4. The electric storage apparatus according to claim 2, wherein the projection includes a groove portion into which the end edge that defines the opening portion is to be fitted.

5. The electric storage apparatus according to claim 1, wherein the first external housing comprises a resin, and
wherein the second external housing comprises a metal.

6. The electric storage apparatus according to claim 2, wherein the second external housing includes a framework for surrounding the first external housing.

7. The electric storage apparatus according to claim 6, wherein the first external housing includes the projection,
   wherein the framework of the second external housing includes the opening portion, and
   wherein the opening portion is formed as a cutout opened at one end of the framework.

8. The electric storage apparatus according to claim 7, wherein the second external housing further includes a cover for closing the opening at the one end of the framework, and
   wherein the cover closes an opened area of the opening portion while closing the opening at the one end of the framework.

9. The electric storage apparatus according to claim 1, further comprising a heat sink that is placed so as to be opposed to the first external housing.

10. The electric storage apparatus according to claim 1, wherein the first external housing comprises a resin, and
    wherein a projection that includes one of the engaging portions is formed on an outer surface of the first external housing.

11. The electric storage apparatus according to claim 10, wherein the second external housing comprises a metal, and
    wherein an opening portion in which the projection is inserted is formed on the second external housing.

12. The electric storage apparatus according to claim 11, wherein the opening portion comprises a hole surrounded by an unopened surface.

13. The electric storage apparatus according to claim 1, further comprising a heat sink that extends substantially perpendicularly to the second main wall portions and the second side-wall portions and that closes the second opening.

14. An electric storage apparatus, comprising:
    a plurality of electric storage devices, each electric storage device including a cell case in which an electrode assembly is accommodated, the cell case having a substantially hexahedral shape;
    a first external housing for housing the electric storage devices, the first external housing comprising a pair of first main wall portions that are opposed to each other and a pair of first side wall portions that are opposed to each other, the pair of first main wall portions and the pair of first side wall portions defining a first opening at at least one end in a first direction thereof, the first external housing comprising a resin;
    a second external housing for housing the first external housing, the second external housing comprising a pair of second main wall portions that are opposed to each other and a pair of second side wall portions that are opposed to each other, the pair of second main wall portions and the pair of second side wall portions defining a second opening at at least one end in the first direction thereof, the second external housing comprising a metal; and
    a heat sink that extends substantially perpendicularly to the second main wall portions and the second side wall portions and that closes the second opening,
    wherein the first external housing and the second external housing respectively include engaging portions, which are engaged with each other.

15. The electric storage apparatus according to claim 14, wherein the heat sink has a plate-like shape.

* * * * *